(12) United States Patent
Salter et al.

(10) Patent No.: US 11,999,254 B2
(45) Date of Patent: Jun. 4, 2024

(54) COORDINATED BI-DIRECTIONAL CHARGING FOR VEHICLES

(71) Applicant: Ford Global Technologies, LLC, Dearborn, MI (US)

(72) Inventors: Stuart C. Salter, White Lake, MI (US); Jim Baumbick, Northville, MI (US); David Kennedy, Canton, MI (US); Annette Lynn Huebner, Highland, MI (US); Peter Phung, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 358 days.

(21) Appl. No.: 17/399,145

(22) Filed: Aug. 11, 2021

(65) Prior Publication Data

US 2023/0052002 A1 Feb. 16, 2023

(51) Int. Cl.
*B60L 53/66* (2019.01)
*B60L 53/68* (2019.01)

(52) U.S. Cl.
CPC ............. *B60L 53/66* (2019.02); *B60L 53/68* (2019.02)

(58) Field of Classification Search
CPC ................................ B60L 53/66; B60L 53/68
USPC ........................................................ 701/22
See application file for complete search history.

(56) References Cited

U.S. PATENT DOCUMENTS

| | | | |
|---|---|---|---|
| 10,417,680 B2 | 9/2019 | Boliman, IV | |
| 2014/0089064 A1* | 3/2014 | Hyde | B60L 53/65 705/14.4 |
| 2019/0047427 A1* | 2/2019 | Pogorelik | G06Q 20/405 |
| 2019/0132719 A1* | 5/2019 | Mizutani | G08G 1/205 |
| 2022/0069611 A1* | 3/2022 | Harris | B60L 53/305 |
| 2022/0410895 A1* | 12/2022 | Salter | B60L 53/68 |

FOREIGN PATENT DOCUMENTS

JP 5696654 B2 4/2015

OTHER PUBLICATIONS

Hermana, R. A., et al., "Peer to Peer Energy Trading with Electric Vehicles," IEEE Intelligent Transportation Systems, 2016, 12 apges.

* cited by examiner

*Primary Examiner* — Mahmoud S Ismail
(74) *Attorney, Agent, or Firm* — Christopher Storms; Bejin Bieneman PLC

(57) ABSTRACT

A system comprises a computer having a processor and a memory, the memory storing instructions executable by the processor to receive, from a charge-requesting vehicle, a charge request, determine a suggested provider pool for fulfilling the charge request, the suggested provider pool including multiple suggested charge-providing vehicles, send suggested provider data to the charge-requesting vehicle, the suggested provider data identifying the multiple suggested charge-providing vehicles, receive, from the charge-requesting vehicle, a provider selection identifying one of the multiple suggested charge-providing vehicles as a selected charge-providing vehicle, identify transfer parameters for a battery charge transfer from the selected charge-providing vehicle to the charge-requesting vehicle; and send a transfer initiation message to instruct the selected charge-providing vehicle to initiate the battery charge transfer according to the transfer parameters.

20 Claims, 6 Drawing Sheets

300

COORDINATED BI-DIRECTIONAL CHARGING FOR VEHICLES

BACKGROUND

A bi-directional charging-capable battery can act both as a power sink that accepts charge from an external power source (e.g., in the manner of an ordinary rechargeable battery) and as a power source that provides charge to an external power sink. Charge of a bi-directional charging-capable battery of one vehicle can be used to charge a battery of another vehicle.

DETAILED DESCRIPTION

Figure 1:
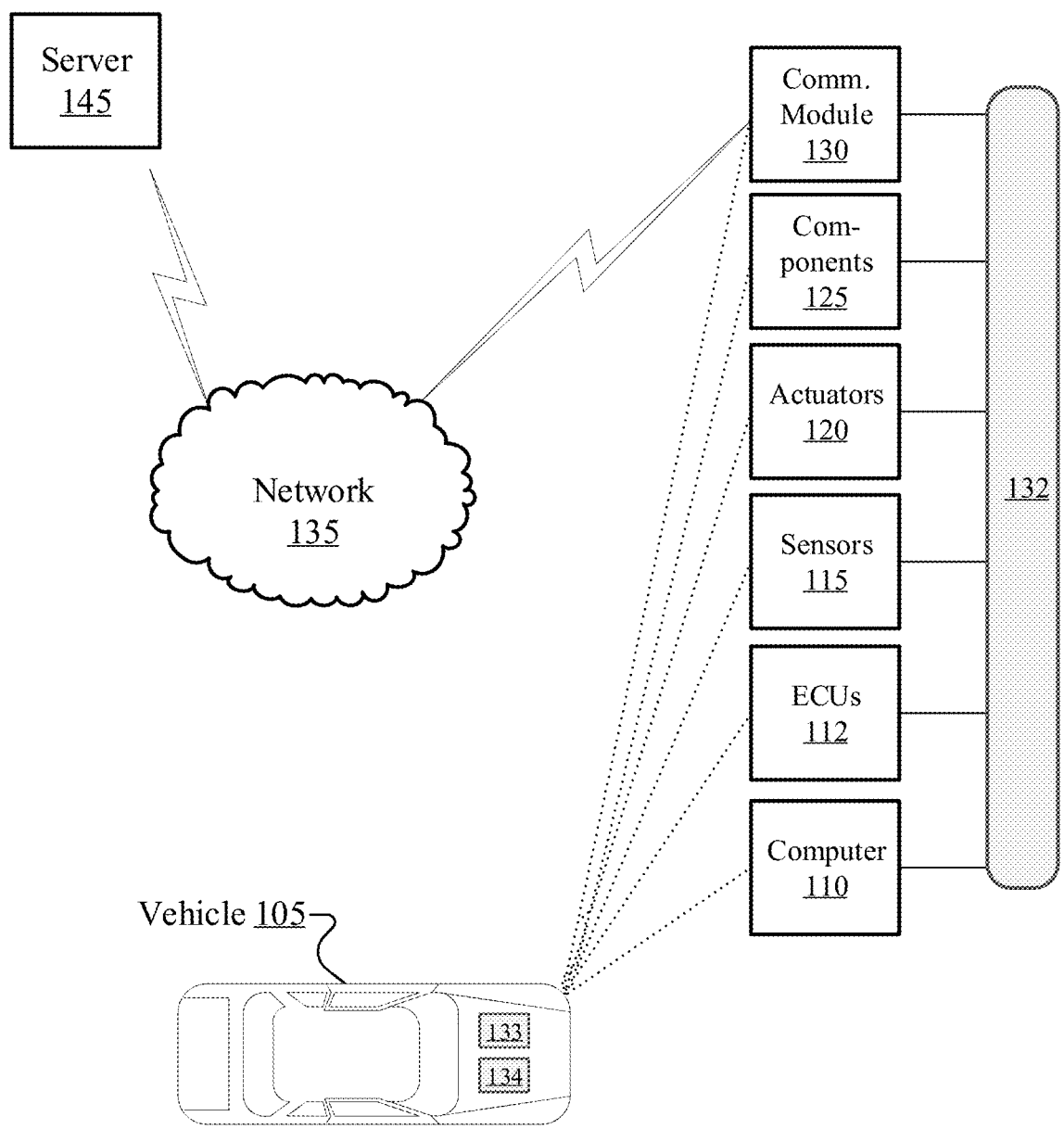
FIG. 1 is a block diagram of an example system.

Disclosed herein is a bi-directional charging system in which battery charge transfers can be conducted to efficiently provide battery charge to vehicles. Data regarding candidate charge providers can be captured and provided to vehicles requesting battery charging service. The efficiency with which candidate charge providers can charge the batteries of requesting vehicles can be estimated. By taking such estimates into consideration when arranging battery charge transfers, requesting vehicles can fulfill their battery charge needs more efficiently.

A system can comprise a computer having a processor and a memory, the memory storing instructions executable by the processor to receive, from a charge-requesting vehicle, a charge request, determine a suggested provider pool for fulfilling the charge request, the suggested provider pool including multiple suggested charge-providing vehicles, send suggested provider data to the charge-requesting vehicle, the suggested provider data identifying the multiple suggested charge-providing vehicles, receive, from the charge-requesting vehicle, a provider selection identifying one of the multiple suggested charge-providing vehicles as a selected charge-providing vehicle, identify transfer parameters for a battery charge transfer from the selected charge-providing vehicle to the charge-requesting vehicle; and send a transfer initiation message to instruct the selected charge-providing vehicle to initiate the battery charge transfer according to the transfer parameters.

The charge request can comprise one or more charge request parameters.

The memory can store instructions executable by the processor to determine a candidate provider pool based on the one or more charge request parameters and select the multiple suggested charge-providing vehicles of the suggested provider pool from among a plurality of vehicles of the candidate provider pool.

The memory can store instructions executable by the processor to determine the candidate provider pool based on charge requestor data for the charge-requesting vehicle.

The one or more charge request parameters can include a charge request parameter that indicates a location for the battery charge transfer.

The one or more charge request parameters can include a charge request parameter that indicates an amount of charge to be transferred via the battery charge transfer.

The one or more charge request parameters can include a charge request parameter that indicates a duration for the battery charge transfer.

The memory can store instructions executable by the processor to select the multiple suggested charge-providing vehicles based on confidence scores associated with the multiple suggested charge-providing vehicles.

The suggested provider data can indicate the confidence scores associated with the multiple suggested charge-providing vehicles.

The memory can store instructions executable by the processor to send a confirmation request to the selected charge-providing vehicle, receive a confirmation from the selected charge-providing vehicle in response to the confirmation request, and send the transfer initiation message responsive to receipt of the confirmation from the selected charge-providing vehicle.

A method can comprise receiving, from a charge-requesting vehicle, a charge request, determining a suggested provider pool for fulfilling the charge request, the suggested provider pool including multiple suggested charge-providing vehicles, sending suggested provider data to the charge-requesting vehicle, the suggested provider data identifying the multiple suggested charge-providing vehicles, receiving, from the charge-requesting vehicle, a provider selection identifying one of the multiple suggested charge-providing vehicles as a selected charge-providing vehicle, identifying transfer parameters for a battery charge transfer from the selected charge-providing vehicle to the charge-requesting vehicle, and sending a transfer initiation message to instruct the selected charge-providing vehicle to initiate the battery charge transfer according to the transfer parameters.

The charge request can comprise one or more charge request parameters.

The method can comprise determining a candidate provider pool based on the one or more charge request parameters and selecting the multiple suggested charge-providing vehicles of the suggested provider pool from among a plurality of vehicles of the candidate provider pool.

The method can comprise determining the candidate provider pool based on charge requestor data for the charge-requesting vehicle.

The one or more charge request parameters can include a charge request parameter that indicates a location for the battery charge transfer.

The one or more charge request parameters can include a charge request parameter that indicates an amount of charge to be transferred via the battery charge transfer.

The one or more charge request parameters can include a charge request parameter that indicates a duration for the battery charge transfer.

The method can comprise selecting the multiple suggested charge-providing vehicles based on confidence scores associated with the multiple suggested charge-providing vehicles.

The suggested provider data can indicate the confidence scores associated with the multiple suggested charge-providing vehicles.

The method can comprise sending a confirmation request to the selected charge-providing vehicle, receiving a confirmation from the selected charge-providing vehicle in response to the confirmation request, and sending the transfer initiation message responsive to receipt of the confirmation from the selected charge-providing vehicle.

FIG. 1 is a block diagram of an example vehicle system 100. The system 100 includes a vehicle 105, which is a land vehicle such as a car, truck, etc. The vehicle 105 includes a computer 110, electronic control units (ECUs) 112, vehicle sensors 115, actuators 120 to actuate various vehicle components 125, a communications module 130, a vehicle network 132, a bi-directional charging-capable battery 133, and a bi-directional charging interface 134. Communications module 130 allows vehicle 105 to communicate with a server 145 via a network 135.

The computer 110 includes a processor and a memory. The memory includes one or more forms of computer-readable media, and stores instructions executable by the processor for performing various operations, including as disclosed herein. The processor can be implemented using any suitable processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor, or any other suitable microprocessor or central processing unit (CPU). The processor also can be implemented as a dedicated processor, such as a controller, a microcontroller, an embedded processor, a chip multiprocessor (CMP), a co-processor, a graphics processor, a graphics processing unit (GPU), a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In some implementations, computer 110 can include multiple processors, each one of which can be implemented according to any of the examples above.

The computer 110 may operate vehicle 105 in an autonomous, a semi-autonomous mode, or a non-autonomous (manual) mode, i.e., can control and/or monitor operation of the vehicle 105, including controlling and/or monitoring components 125. For purposes of this disclosure, an autonomous mode is defined as one in which each of vehicle propulsion, braking, and steering are controlled by the computer 110; in a semi-autonomous mode the computer 110 controls one or two of vehicle propulsion, braking, and steering; in a non-autonomous mode a human operator controls each of vehicle propulsion, braking, and steering.

The computer 110 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may be communicatively coupled to, e.g., via vehicle network 132 as described further below, one or more processors located in other device(s) included in the vehicle 105. Further, the computer 110 may communicate, via communications module 130, with a navigation system that uses the Global Position System (GPS). As an example, the computer 110 may request and receive location data of the vehicle 105. The location data may be in a conventional format, e.g., geo-coordinates (latitudinal and longitudinal coordinates).

ECUs 112 (which can also be referred to as electronic control modules (ECMs) or simply as "control modules") are computing devices that monitor and/or control various vehicle components 125 of vehicle 105. Examples of ECUs 112 can include an engine control module, a transmission control module, a powertrain control module, a brake control module, a steering control module, and so forth. Any given ECU 112 can include a processor and a memory. The memory can include one or more forms of computer-readable media, and can store instructions executable by the processor for performing various operations, including as disclosed herein. The processor of any given ECU 112 can be implemented using a general-purpose processor or a dedicated processor or processing circuitry, including any of the examples identified above in reference to a processor included in computer 110.

In some implementations, the processor of a given ECU 112 can be implemented using a microcontroller. In some implementations, the processor of a given ECU 112 can be implemented using a dedicated electronic circuit including an ASIC that is manufactured for a particular operation, e.g., an ASIC for processing sensor data and/or communicating the sensor data. In some implementations, the processor of a given ECU 112 can be implemented using an FPGA, which is an integrated circuit manufactured to be configurable by an occupant. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of general-purpose processor(s), ASIC(s), and/or FPGA circuits may be included in a given ECU 112.

Vehicle network 132 is a network via which messages can be exchanged between various devices in vehicle 105. Computer 110 can be generally programmed to send and/or receive, via vehicle network 132, messages to and/or from other devices in vehicle 105 (e.g., any or all of ECUs 112, sensors 115, actuators 120, components 125, communications module 130, a human machine interface (HMI), etc.). Additionally or alternatively, messages can be exchanged among various such other devices in vehicle 105 via vehicle network 132. In cases in which computer 110 actually comprises a plurality of devices, vehicle network 132 may be used for communications between devices represented as computer 110 in this disclosure. Further, as mentioned below, various controllers and/or vehicle sensors 115 may provide data to the computer 110.

In some implementations, vehicle network 132 can be a network in which messages are conveyed via a vehicle communications bus. For example, vehicle network can include a controller area network (CAN) in which messages are conveyed via a CAN bus, or a local interconnect network (LIN) in which messages are conveyed via a LIN bus.

In some implementations, vehicle network 132 can include a network in which messages are conveyed using other wired communication technologies and/or wireless communication technologies (e.g., Ethernet, WiFi, Bluetooth, etc.). Additional examples of protocols that may be used for communications over vehicle network 132 in some implementations include, without limitation, Media Oriented System Transport (MOST), Time-Triggered Protocol (TTP), and FlexRay.

In some implementations, vehicle network 132 can represent a combination of multiple networks, possibly of different types, that support communications among devices in vehicle 105. For example, vehicle network 132 can include a CAN in which some devices in vehicle 105 communicate via a CAN bus, and a wired or wireless local area network in which some device in vehicle 105 communicate according to Ethernet or Wi-Fi communication protocols.

Vehicle sensors 115 may include a variety of devices such as are known to provide data to the computer 110. For example, the vehicle sensors 115 may include Light Detection and Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects (possibly including second vehicles), etc., relative to the location of the vehicle 105. The vehicle sensors 115 may further include camera sensor(s) 115, e.g., front view, side view, rear view, etc., providing images from a field of view inside and/or outside the vehicle 105.

Actuators 120 are implemented via circuitry, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via communication module 130 with devices outside of the vehicle 105, e.g., through vehicle-to-vehicle (V2V) or vehicle-to-infrastructure (V2X) wireless communications to another vehicle, to (typically via the network 135) a remote server 145. The communications module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth®, IEEE 802.11, dedicated short range communications (DSRC), and/or wide area networks (WAN), including the Internet, providing data communication services.

The network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC) and cellular V2V (CV2V), cellular V2X (CV2X), etc.), local area networks (LAN) and/or wide area networks (WAN), including the Internet, providing data communication services.

Computer 110 can receive and analyze data from sensors 115 substantially continuously, periodically, and/or when instructed by a server 145, etc. Further, object classification or identification techniques can be used, e.g., in a computer 110 based on lidar sensor 115, camera sensor 115, etc., data, to identify a type of object, e.g., vehicle, person, rock, pothole, bicycle, motorcycle, etc., as well as physical features of objects.

Figure 2:
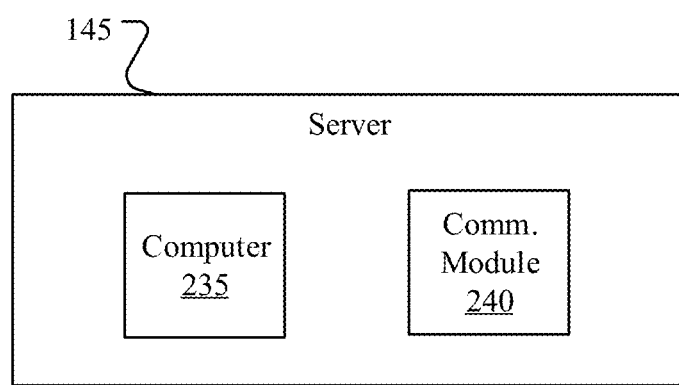
FIG. 2 is a block diagram of an example server.

FIG. 2 is a block diagram of an example server 145. The server 145 includes a computer 235 and a communications module 240. The computer 235 includes a processor and a memory. The memory includes one or more forms of computer-readable media, and stores instructions executable by the computer 235 for performing various operations, including as disclosed herein. The communications module 240 can include conventional mechanisms for wired and/or wireless communications, e.g., radio frequency communications using suitable protocols, that allow computer 235 to communicate with other devices, such as the vehicle 105, via wireless and or wired communication networks/links.

As noted above, vehicle 105 includes bi-directional charging-capable battery 133. As used herein, the term "bi-directional charging-capable battery" means a battery that can act both as a power sink that accepts charge from an external power source (e.g., in the manner of an ordinary rechargeable battery) and as a power source that provides charge to an external power sink (e.g., another bi-directional charging-capable battery or another type of rechargeable battery). Bi-directional charging-capable battery 133 provides electrical power to various subsystems of vehicle 105, which consume that power in conjunction with vehicle operations of various types, such as vehicle propulsion, braking, steering, lighting, climate control, driver assistance, etc. In some implementations, bi-directional charging-capable battery 133 can provide electrical power that is used for propulsion of vehicle 105 (e.g., by an electric motor or hybrid engine).

Bi-directional charging interface 134 is a physical interface, e.g., and electric plug and/or socket, and interface for induction charging, etc., via which electrical connectivity can be established between bi-directional charging-capable battery 133 and external power source(s)/sink(s).

Figure 3:
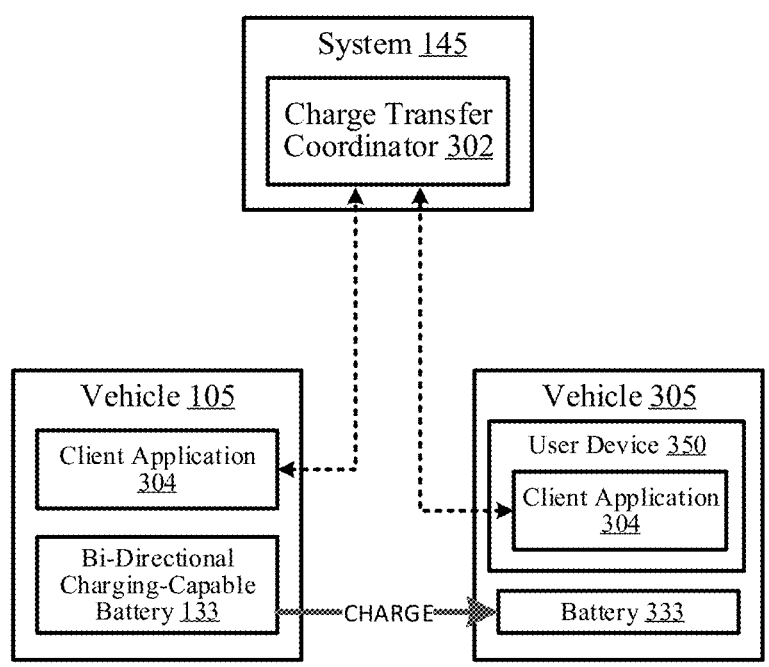
FIG. 3 is a block diagram of an example bi-directional charging system.

FIG. 3 is a block diagram of an example bi-directional charging system 300. In bi-directional charging system 300, the bi-directional charging capabilities of bi-directional charging-capable battery 133 can be used for battery charge transfers via which charge is provided to other vehicles that require/desire it.

Bi-directional charging system 300 includes server 145, which can execute a charge transfer coordinator 302. Charge transfer coordinator 302 can coordinate battery charge transfers among vehicles in bi-directional charging system 300. In order to participate in such battery charge transfers, vehicles in bi-directional charging system 300 (e.g., vehicle 105 and vehicle 305) can execute a client application 304. With respect to some vehicles in bi-directional charging system 300, client application 304 can execute on computing/processing circuitry/hardware of the vehicle itself (e.g., computer 110 of vehicle 105). Alternatively or additionally, with respect to some vehicles in bi-directional charging system 300, client application 304 can execute on a user device (e.g., a tablet, smartphone, etc.) operated by an owner/operator associated with the vehicle in question. For example, as shown in FIG. 3, client application 304 can execute on a user device 350 operated by an owner/operator associated with vehicle 305. A user device on which client application 304 executes may not necessarily be located within the vehicle with which it is associated. For instance, while vehicle 305 is parked in a parking lot and client application 304 executes on user device 350, user device 350 may be located within a nearby office building (on the person of an owner of vehicle 305). Programming that can be included in and executed by charge transfer coordinator 302 and client application 304 is discussed further below, including with respect to FIGS. 4 and 5.

Charge transfer coordinator 302 can send/receive messages to/from client applications 304 executing at vehicles in bi-directional charging system 300 in conjunction with coordinating battery charge transfers among vehicles in bi-directional charging system 300. For any particular vehicle, client application 304 can send and/or receive messages to/from charge transfer coordinator 302 in conjunction with arranging participation in battery charge transfers.

In a battery charge transfer in bi-directional charging system 300, charge is transferred from a battery of one vehicle to a battery of another vehicle. In the depicted example, charge is transferred from bi-directional charging-capable battery 133 of vehicle 105 to a battery 333 of a vehicle 305, which can be a bi-directional charging-capable vehicle or can be a non bi-directional charging-capable vehicle. The battery from which charge is transferred (e.g., bi-directional charging-capable battery 133) is referred to herein as the "charge-providing battery," and the vehicle comprising the charge-providing battery (e.g., vehicle 105) is referred to herein as the "charge-providing vehicle." The battery to which charge is transferred (e.g., battery 333) is referred to herein as the "charge-receiving battery," and the vehicle comprising the charge-receiving battery (e.g., vehicle 305) is referred to herein as the "charge-receiving vehicle."

Figure 4:
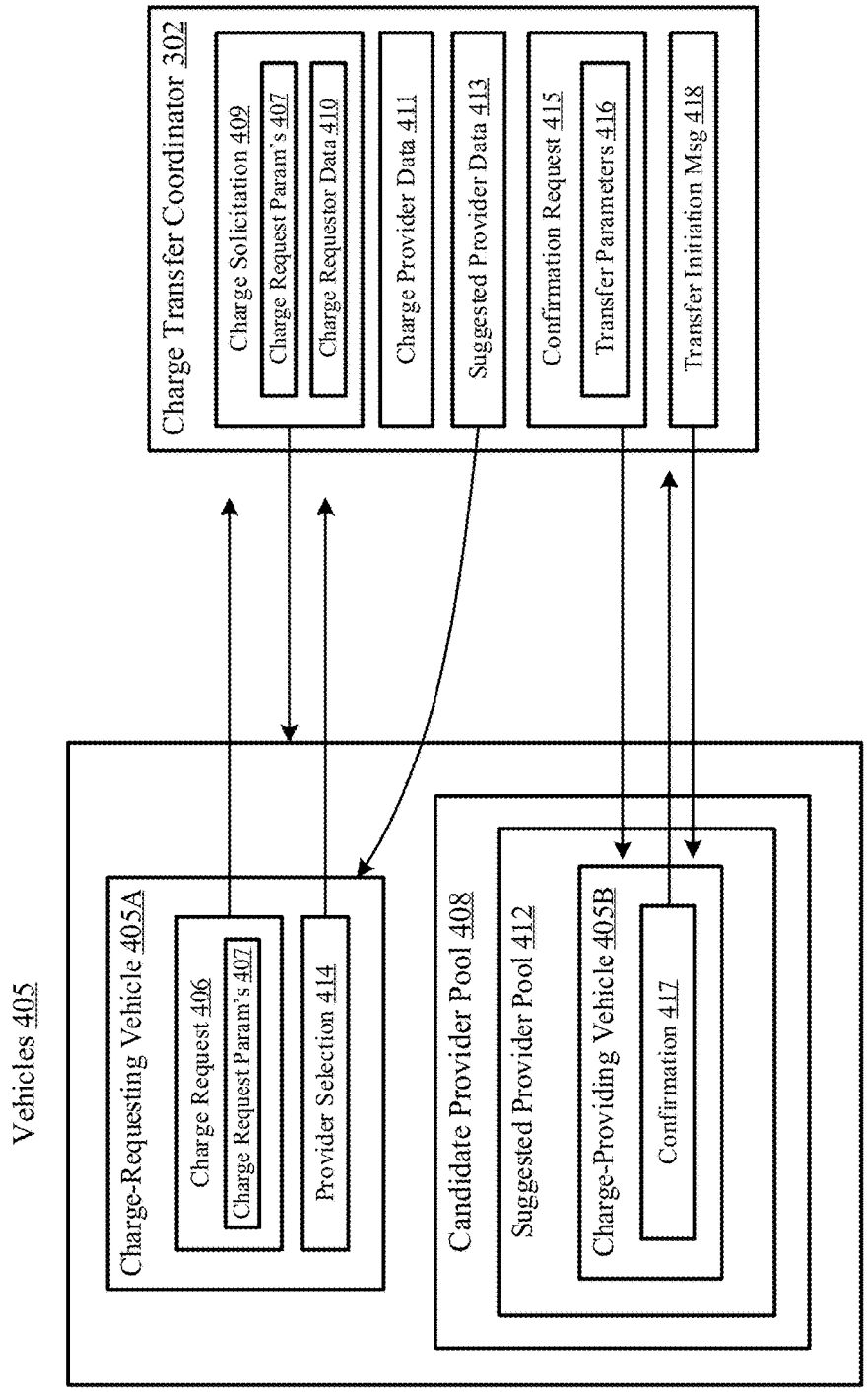
FIG. 4 is a block diagram of an example transfer coordination procedure.

FIG. 4 illustrates an example transfer coordination procedure 400 for bi-directional charging system 300. According to the transfer coordination procedure of FIG. 4, charge transfer coordinator 302 coordinates a battery charge transfer between a charge-requesting vehicle 405A and a charge providing vehicle 405B, both of which are among a plurality of vehicles 405 in bi-directional charging system 300. Operations of charge-requesting vehicle 405A and charge providing vehicle 405B are performed by client application 304 (not shown), which executes at charge-requesting vehicle 405A and charge providing vehicle 405B. The transfer coordination procedure is initiated when charge-requesting vehicle 405A sends a charge request 406 to charge transfer coordinator 302 to request provision of battery charge via a battery charge transfer.

Charge request 406 can include charge request parameters 407 that specify aspects of the battery charge transfer to be conducted. Charge-requesting vehicle 405A can obtain charge request parameters 407 from user input (e.g., user input that causes charge-requesting vehicle 405A to send charge request 406), can retrieve previously-stored charge request parameters 407 (e.g., parameters corresponding to previously specified user preferences), or a combination of both. Charge request parameters 407 can include numerical values, Boolean values, binary values, text values, etc.

In some implementations, charge request parameters 407 can include parameter(s) (e.g., an address, GPS coordinates, etc.) indicating a location at which the battery charge transfer is to be conducted. In some cases (e.g., when the state of charge of charge-requesting vehicle 405A's battery is low enough to render charge-requesting vehicle 405A unable to move), this location may correspond to the location of charge-requesting vehicle 405A. In other cases, the parameter(s) may indicate a location other than that of charge-requesting vehicle 405A, such as a location of a public parking lot, highway rest stop or service plaza, etc.

In some implementations, charge request parameters 407 can include parameter(s) indicating a required amount of charge to be transferred (or a required charge level to be reached) and/or a required charging rate/speed for the battery charge transfer. In some implementations, charge request parameters 407 can include parameter(s) indicating a desired start time for the battery charge transfer. In some implementations, charge request parameters 407 can include parameter(s) indicating a maximum duration for the battery charge transfer and/or a minimum duration for the battery charge transfer. In some implementations, charge request parameters 407 can include parameter(s) indicating minimum acceptable performance/reliability ratings for charge-providing vehicle 405B. In some implementations, charge request parameters 407 can include parameter(s) indicating terms/conditions for the battery charge transfer (e.g., a price per unit of transferred charge or a collective price for the transferred charge, payment terms, etc.)

Responsive to receipt of charge request 406, charge transfer coordinator 302 can determine a candidate provider pool 408 for fulfilling charge request 406. Candidate provider pool 408 can include one or more candidate providers, each of which is a vehicle (among the vehicles 405 in bi-directional charging system 300) that is able and willing to fulfill charge request 406. Charge transfer coordinator 302 can determine candidate provider pool 408 based on charge request parameters 407. For example, charge transfer coordinator 302 can identify, among the vehicles 405 of bi-directional charging system 300, vehicles that have the capacity to provide the desired amount of charge according to a desired timing as indicated by charge request parameters 407, and are willing to do so for a price indicated by charge request parameters 407.

In some implementations, charge transfer coordinator 302 can assess the ability and/or willingness of one or more vehicles 405 to fulfill charge request 406 based on charge provider data 411. In some implementations, charge provider data 411 can include data indicating charge provision capabilities of vehicles in bi-directional charging system 300 (e.g., amounts of charge that they are capable of providing, rates at which they are capable of providing charge, charging interfaces with which they are compatible, etc.). In some implementations, charge provider data 411 can include data indicating terms/conditions that are required by (or unacceptable to) particular vehicles 405 when those vehicles serve as charge providers. In some implementations, charge provider data 411 can include data characterizing various historically-observed aspects of the behaviors of owners/operators of various vehicles of bi-directional charging system 300 in conjunction with past provision of charging services.

In some implementations, charge transfer coordinator 302 can send a charge solicitation 409 to one or more of vehicles 405 in order to assess their ability to fulfill charge request 406. In some implementations, charge transfer coordinator 302 may identify (e.g., based on charge provider data 411)

one or more vehicles that are capable of fulfilling charge request 406, and may send charge solicitation 409 to those one or more vehicles to inquire as to their willingness to fulfill charge request 406. In some implementations, charge transfer coordinator 302 may include some or all of charge request parameters 407 in charge solicitation 409 to inform the vehicles receiving charge solicitation 409 of terms/conditions specified by charge-requesting vehicle 405A, and those vehicles may determine whether or not they are willing to fulfill charge request 406 based on the indicated terms/conditions.

In some implementations, charge transfer coordinator 302 can include charge requestor data 410 in charge solicitation 409. In some implementations, vehicles receiving charge solicitation 409 can assess the desirability of engaging in charge transfers with charge-requesting vehicle 405A based on charge requestor data 410. Charge requestor data 410 is data characterizing various historically-observed aspects of the behavior of the owner/operator of charge-requesting vehicle 405A in the context of past battery charge transfers. For example, charge requestor data 410 can include data indicating whether the owner/operator of charge-requesting vehicle 405A has been a "no-show" for past charge transfers, has failed to provide (or timely provide) payment for past charge transfers (e.g., has written bad checks), has engaged in fraudulent activities in conjunction with past charge transfers, etc.

In some implementations, charge transfer coordinator 302 can identify candidate provider pool 408 as including each vehicle that responds to charge solicitation 409 with an indication of willingness to fulfill charge request 406. In some implementations, charge transfer coordinator 302 can send charge solicitation 409 to vehicles of bi-directional charging system 300 without assessing those vehicles' ability to fulfill charge request 406. Those vehicles can then assess their own ability to fulfill charge request 406 (e.g., based on charge request parameters 407 comprised in charge solicitation 409), and can determine to respond to charge solicitation 409 accordingly, or could determine not to respond. In some implementations, vehicles that are unwilling and/or unable to fulfill charge request 406 can simply ignore charge solicitation 409, while vehicles that are willing and able to fulfill charge request 406 can respond to it to indicate their ability and willingness to fulfill charge request 406. In some implementations, charge transfer coordinator 302 can simply broadcast charge solicitation 409 to the set of vehicles 405 in bi-directional charging system 300, rather than sending charge solicitation 409 only to particular vehicles.

In some implementations, charge transfer coordinator 302 can determine a suggested provider pool 412, which can include one or more suggested charge-providing vehicles for fulfilling charge request 406. The one or more suggested charge-providing vehicles of suggested provider pool 412 can be vehicle(s), among the vehicles 405 of bi-directional charging system 300, that are determined to be especially suitable to serve as the charge-providing vehicle that fulfills charge request 406. In some implementations, charge transfer coordinator 302 can identify suggested provider pool 412 from among the vehicle(s) of candidate provider pool 408.

In some implementations, charge transfer coordinator 302 can determine suggested provider pool 412 by applying a suitability assessment algorithm to assess the candidate providers in candidate provider pool 408 with respect to their suitability for serving as the charge-providing vehicle that fulfills charge request 406. In some implementations, charge transfer coordinator 302 can identify a set of candidate providers (among those of candidate provider pool 408) as suggested provider pool 412 based on their assessed suitabilities. For instance, in some implementations, charge transfer coordinator 302 can identify a particular number of most suitable candidate providers in candidate provider pool 408 (as assessed using the suitability assessment algorithm) as suggested provider pool 412. In some implementations, using the suitability assessment algorithm, charge transfer coordinator 302 can rank the suggested charge-providing vehicles of suggested provider pool 412 according to their respective suitability. In some implementations, according to the suitability assessment algorithm, a respective confidence score can be generated for each candidate provider that indicates the relative suitability of that candidate provider, and the candidate providers can be ranked by their confidence scores.

In some implementations, the suitability assessment algorithm can generate the confidence score for any particular candidate provider based on performance ratings characterizing that candidate provider's performance in conjunction with past charge transfers. The suitability assessment algorithm can consider various criteria in generating such performance ratings. These criteria can include objective criteria, subjective criteria, and/or compliance criteria. In some implementations, the suitability assessment algorithm can determine a reliability score for the candidate provider based on the performance ratings. In some implementations, the suitability assessment algorithm can then arrive at the confidence score for the candidate provider by adjusting the reliability score to an extent needed (if any) to account for challenges/limitations imposed by underlying circumstances/conditions associated with the transfer (e.g., a score reduction may be applied if it is unclear whether the candidate provider has enough battery charge remaining to reach the charge-requesting vehicle and provide the requested amount of charge).

In some implementations, the suitability assessment algorithm can generate confidence scores for candidate providers according to Equations 1, 2, and 3 as follows:

$$P(V_D^x) = f(C_{obj}(V_D^x), C_{subj}(V_D^x), C_{comp}(V_D^x)) \quad (1)$$

$$R(V_D) = \overline{P(V_D^x)_{X_1}^{X_2}} \quad (2)$$

$$S(V_R, V_D) = R(V_D) * L(V_R, V_D) \quad (3)$$

where $V_D^x$ is an $x^{th}$ battery charge transfer in which a candidate provider $V_D$ has participated, $P(V_D^x)$ is a performance rating for that battery charge transfer $V_D^x$, $C_{obj}(V_D^x)$, $C_{subj}(V_D^x)$, and $C_{comp}(V_D^x)$ are objective criteria, subjective criteria, and compliance criteria applicable to candidate provider $V_D$ with respect to the battery charge transfer $V_D^x$, $R(V_D)$ is a reliability rating for candidate provider $V_D$, $\overline{P(V_D^x)_{X_1}^{X_2}}$ is a weighted average of performance ratings $P(V_D^x)$ for candidate provider $V_D$ over a preceding series of battery charge transfers $X_1$ to $X_2$, $L(V_R, V_D)$ is a reduction factor applicable to the requested battery charge transfer if fulfilled by candidate provider $V_D$, and $S(V_R, V_D)$ is a confidence score for the candidate provider $V_D$ with respect to the requested battery charge transfer to a charge-requesting vehicle $V_R$ (e.g., charge-requesting vehicle 405A).

In some implementations, the objective criteria that the suitability assessment algorithm considers in conjunction with generating a performance rating characterizing the performance of a charge provider in conjunction with a particular battery charge transfer can include logged bi-directional attributes captured via vehicle telematics, such as an actual amount of charge transferred, a time of arrival of the charge provider at the location of the charge transfer, a duration of the charge transfer, etc.

In some implementations, the objective criteria can include criteria relating to the condition of the charge-providing vehicle. In some implementations, the objective criteria can include a last service date, a warranty call history, and/or other factors indicating whether the vehicle is in up-to-date condition. In some implementations, the objective criteria can include a previous vehicle repair history and/or an insurance claim history for the charge-providing vehicle. In some implementations, the objective criteria can include an age of the charge-providing vehicle, and/or a depth of discharge/charge acceptance of the charge-providing battery. In some implementations, the objective criteria can include a smart charging efficiency realized by the charge-providing vehicle. In some implementations, the objective criteria can include prognostics or telematics associated with the charge-providing vehicle that indicate vehicle conditions such as battery condition, suitability of need for maintenance, recall status, etc.

In some implementations, the objective criteria can include criteria relating to vehicle/driver readiness with respect to the charge-providing vehicle. In some implementations, the objective criteria can include current and/or average daily state-of-charge levels and charging statuses. In some implementations, the objective criteria can include distances traveled and/or service coverage areas.

In some implementations, the subjective criteria that the suitability assessment algorithm considers in conjunction with generating a performance rating characterizing the performance of a charge provider in conjunction with a particular battery charge transfer can include a customer experience rating specified by an owner/operator of the charge-receiving vehicle. In some implementations, the subjective criteria can include customer service feedback/comments provided by that owner/operator.

In some implementations, the compliance criteria that the suitability assessment algorithm considers in conjunction with generating a performance rating characterizing the performance of a charge provider in conjunction with a particular battery charge transfer can include results of background checks and/or criminal record checks. In some implementations, the compliance criteria can include driver's license validity, possession of insurance, safety/accident records, and/or other criteria.

In some implementations, charge transfer coordinator 302 can send suggested provider data 413 to charge-requesting vehicle 405A in order to inform charge-requesting vehicle 405A regarding the providers in suggested provider pool 412. In some implementations, suggested provider data 413 can indicate the confidence scores and/or relative rankings of the providers in suggested provider pool 412. In some implementations, suggested provider data 413 can include charge provider data 411 associated with the providers in suggested provider pool 412.

In some implementations, at charge-requesting vehicle 405A (or an associated user device executing client application 304), suggested provider pool 412 can be presented on a user interface (e.g., as a list ranked in order of confidence score). In some implementations, charge provider data 411 associated with the providers in suggested provider pool 412 can also be presented on the user interface. In some implementations, an owner/operator of charge-requesting vehicle 405A can provide user input indicating a selection of one of the suggested charge-providing vehicles in suggested provider pool 412 as the charge-providing vehicle 405B for the battery charge transfer to charge-requesting vehicle 405A. In some implementations, charge-requesting vehicle 405A can send a provider selection 414 to charge transfer coordinator 302 to inform charge transfer coordinator 302 of the identity of the suggested charge-providing vehicle (among those of suggested provider pool 412) that has been selected as the charge-providing vehicle 405B for the battery charge transfer to charge-requesting vehicle 405A.

Responsive to receipt of provider selection 414, charge transfer coordinator 302 can send a confirmation request 415 to charge-providing vehicle 405B. Confirmation request 415 can notify charge-providing vehicle 405B that charge-requesting vehicle 405A has selected as the charge-providing vehicle for the battery charge transfer, and can request confirmation from charge-providing vehicle 405B that it will participate in the battery charge transfer in accordance with terms/conditions specified by transfer parameters 416 included in confirmation request 415. Transfer parameters 416 can include parameters specifying various terms/conditions for the battery charge transfer. For example, transfer parameters 416 can include parameters specifying an amount of charge to be transferred and a price to be paid for the transferred charge (e.g., per unit of charge or for the total amount of transferred charge). Charge-providing vehicle 405B can send a confirmation 417 to charge transfer coordinator 302 to confirm that it will participate in the battery charge transfer in accordance with the terms/conditions specified by transfer parameters 416.

In some implementations, responsive to receipt of confirmation 417, charge transfer coordinator 302 may provide charge-requesting vehicle 405A and charge-providing vehicle 405B with private/sensitive information (e.g., personally-identifiable information) regarding each other that has been withheld pending mutual confirmation of intent to participate in the battery charge transfer. In some implementations, such private/sensitive information can include precise GPS locations, owner/operator names, etc.

Following receipt of confirmation 417, charge transfer coordinator 302 can instruct charge-requesting vehicle 405A and charge-providing vehicle 405B to proceed with the battery charge transfer. In some implementations, charge transfer coordinator 302 can send a transfer initiation message 418 to charge-providing vehicle 405B to instruct charge-providing vehicle 405B to initiate the battery charge transfer. In some implementations, responsive to receipt of transfer initiation message 418, a prompt can be presented on a user interface of charge-providing vehicle 405B (or of an associated user device executing client application 304) to instruct an owner/operator of charge-providing vehicle 405B to drive charge-providing vehicle 405B to the designated location for the battery charge transfer.

In some implementations, various security features can be activated as charge-providing vehicle 405B approaches charge-requesting vehicle 405A and/or the designated location for the battery charge transfer. In some implementations, welcome lighting/approach detection features of charge-requesting vehicle 405A and/or charge-providing vehicle 405B can be activated when charge-providing vehicle 405B approaches to within a certain distance of charge-requesting vehicle 405A, in order to visually indicate to each the identity of the other. In some implementations, cameras (e.g., panoramic/360 degree/fisheye cameras) of one or both of charge-requesting vehicle 405A and charge-providing vehicle 405B can be activated when charge-providing vehicle 405B approaches to within a certain distance of charge-requesting vehicle 405A, and can be used to capture video of the transfer. In some implementations, microphones of one or both of charge-requesting vehicle 405A and charge-providing vehicle 405B can be activated when charge-providing vehicle 405B approaches to within a certain distance of charge-requesting vehicle 405A, and can be used to capture audio of the transfer. In some implementations, captured video and/or audio of the transfer can be live-streamed and/or preserved in cloud storage in order to create a video and/or audio record of the transfer.

In some implementations, charge transfer coordinator 302 may electronically notify emergency/911 dispatch and/or law enforcement authorities of the impending/ongoing battery charge transfer. In some implementations, charge transfer coordinator 302 may have the option to provide authorities with access to real-time video of the transfer. In some implementations, charge transfer coordinator 302 may automatically provide authorities with real-time video access under certain circumstances, such as when charge-requesting vehicle 405A is stranded in a remote area.

In some implementations, real-time video of the transfer can be captured and streamed to user devices of friends/family of the owner/operator of charge-requesting vehicle 405A and/or charge-providing vehicle 405B. In some implementations, client application 304 may provide the owners/operators of charge-requesting vehicle 405A and charge-providing vehicle 405B with the ability to activate video streaming to friends/family and designate friends/family to which video is to be streamed. In some implementations, video can be captured and streamed from multiple cameras of either or both of charge-requesting vehicle 405A and/or charge-providing vehicle 405B, which can include cameras of various types, such as interior cameras, panoramic/360 degree/fisheye cameras, B-pillar cameras, advanced driver-assistance systems (ADAS) cameras, etc.

In some implementations, captured video of the transfer can be analyzed in real-time using machine learning techniques to monitor for security threat indicators (e.g., the presence of weapons). In some implementations, friends/family and/or emergency/911 dispatch and/or law enforcement authorities can automatically be notified of any security threat indicators detected in the captured video.

In some implementations, upon resolution of the battery charge transfer—either in the form of successful completion of the battery charge transfer or termination/cancelation thereof—charge transfer coordinator 302 can generate an objective performance rating characterizing aspects of the performance of charge-providing vehicle 405B in conjunction with the battery charge transfer. In some implementations, charge transfer coordinator 302 can generate the objective performance rating by comparing actual observed metrics of the transfer (e.g., actual amount of charge transferred, actual amount of elapsed time, etc.) with metrics specified by the agreed terms/conditions for the transfer (e.g., agreed amount of charge to be transferred, agreed duration for the transfer). In some implementations, the objective performance rating may be added to an accumulated set of objective performance ratings characterizing aspects of charge-providing vehicle 405B's performance in conjunction with previous battery charge transfers.

In some implementations, the owner/operator of charge-requesting vehicle 405A may be prompted (e.g., via a prompt presented by client application 304 as it executed on a user device associated with the owner/operator) to provide a subjective performance rating characterizing aspects of the performance of charge-providing vehicle 405B in conjunction with the battery charge transfer. In some implementations, the owner/operator of charge-requesting vehicle 405A may provide such a subjective performance rating in the form of a customer satisfaction metric such as a star rating (e.g., four stars out of a maximum of five), a numerical grade (e.g., 93 out of 100), a letter grade (e.g., "B+"), or another form. In some implementations, the subjective performance rating may be added to an accumulated set of subjective performance ratings characterizing aspects of charge-providing vehicle 405B's performance in conjunction with previous battery charge transfers.

Figure 5:
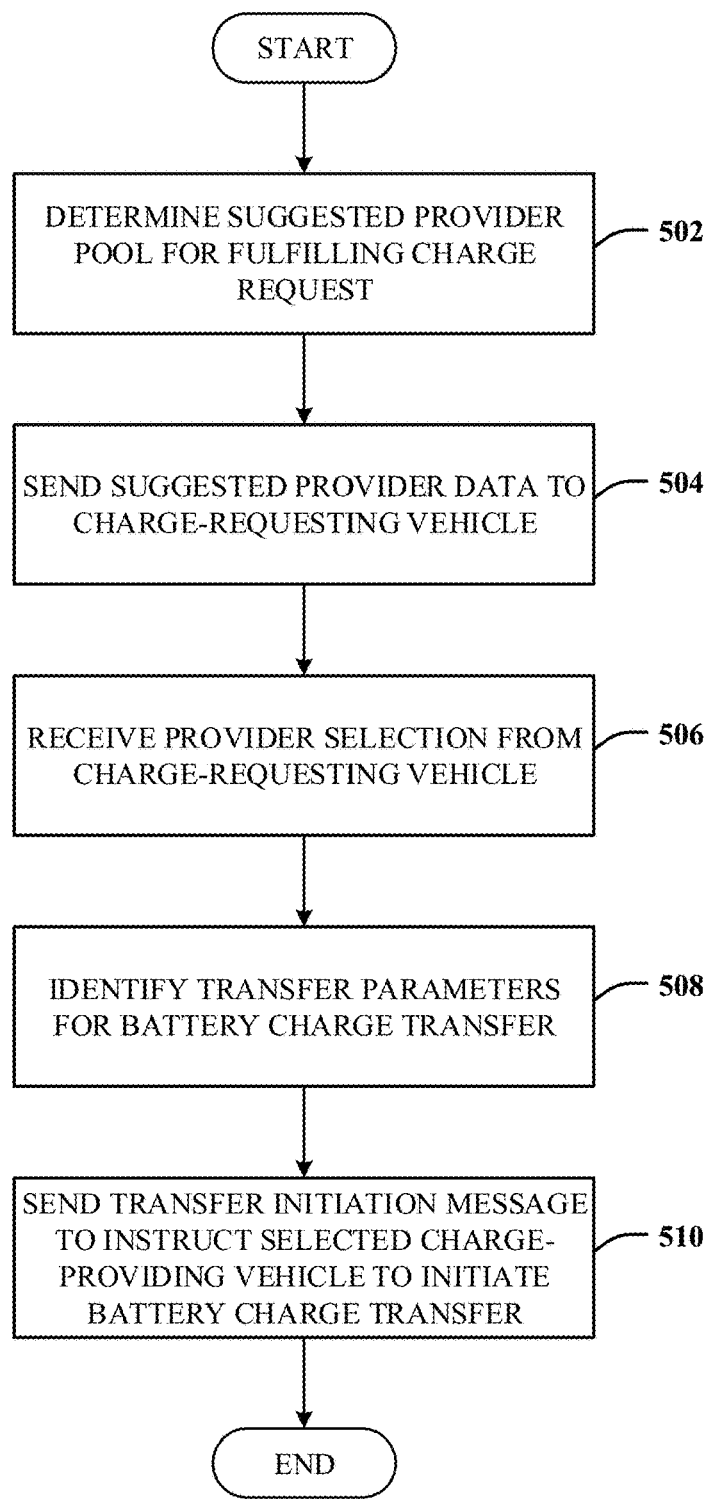
FIG. 5 is a block diagram of an example process flow.

FIG. 5 is a block diagram of an example process flow 500 for carrying out a bi-directional charging operation. As shown in process flow 500, a suggested provider pool for fulfilling a charge request can be determined at 502. For example, in bi-directional charging system 300, charge transfer coordinator 302 can determine suggested provider pool 412 for fulfilling charge request 406. At 504, suggested provider data can be sent to the a charge-requesting vehicle from which the charge request was received. For example, in bi-directional charging system 300, suggested provider data 413 can be sent to charge-requesting vehicle 405A.

At 506, a provider selection can be received from the charge-requesting vehicle. For example, in bi-directional charging system 300, provider selection 414 can be received from charge-requesting vehicle 405A. At 508, transfer parameters can be identified for a battery charge transfer from a selected charge-providing vehicle to the charge-requesting vehicle. For example, in bi-directional charging system 300, transfer parameters 416 can be identified for a battery charge transfer from charge-providing vehicle 405B to charge-requesting vehicle 405A. At 510, a transfer initiation message can be sent to instruct the selected charge-providing vehicle to initiate the battery charge transfer. For example, in bi-directional charging system 300, transfer initiation message 418 can be sent to charge-providing vehicle 405B. The process 500 ends following the block 510.

Figure 6:
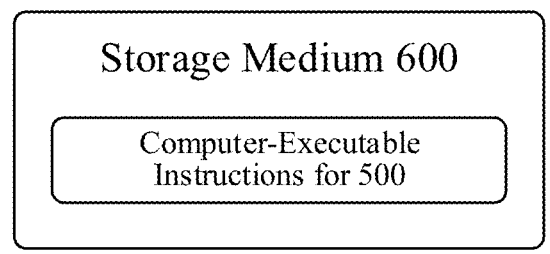
FIG. 6 is a block diagram of an example storage medium.

FIG. 6 illustrates an example storage medium 600. Storage medium 600 may be any non-transitory computer-readable storage medium or machine-readable storage medium, such as an optical, magnetic or semiconductor storage medium. In various implementations, storage medium 600 may be an article of manufacture. In some implementations, storage medium 600 may store computer-executable instructions, such as computer-executable instructions to implement process flow 500. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some implementations, the circuitry may be implemented in, or functions associated with the circuitry may be implemented by, one or more software or firmware modules. In some implementations, circuitry may include logic, at least partially operable in hardware.

As used herein, the adverb "substantially" means that a shape, structure, measurement, quantity, time, etc. may deviate from an exact described geometry, distance, measurement, quantity, time, etc., because of imperfections in materials, machining, manufacturing, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described. The present invention is intended to be limited only by the following claims.

What is claimed is:

1. A system, comprising:
a computer having a processor and a memory, the memory storing instructions executable by the processor to:
receive, from a charge-requesting vehicle, a charge request;
determine a suggested provider pool for fulfilling the charge request, the suggested provider pool including multiple suggested charge-providing vehicles;
send suggested provider data to the charge-requesting vehicle, the suggested provider data identifying the multiple suggested charge-providing vehicles;
receive, from the charge-requesting vehicle, a provider selection identifying one of the multiple suggested charge-providing vehicles as a selected charge-providing vehicle;
identify transfer parameters for a battery charge transfer from the selected charge-providing vehicle to the charge-requesting vehicle;
send a transfer initiation message to instruct the selected charge-providing vehicle to initiate the battery charge transfer according to the transfer parameters;
actuate at least one of a vehicle camera, a vehicle light, and a vehicle microphone when the charge-providing vehicle is within a specified distance of the charge-requesting vehicle; and
output a performance rating for the charge-providing vehicle after the battery charge transfer is completed.

2. The system of claim 1, the charge request comprising one or more charge request parameters.

3. The system of claim 2, the memory storing instructions executable by the processor to:
determine a candidate provider pool based on the one or more charge request parameters; and
select the multiple suggested charge-providing vehicles of the suggested provider pool from among a plurality of vehicles of the candidate provider pool.

4. The system of claim 3, the memory storing instructions executable by the processor to determine the candidate provider pool based on charge requestor data for the charge-requesting vehicle.

5. The system of claim 2, the one or more charge request parameters including a charge request parameter that indicates a location for the battery charge transfer.

6. The system of claim 2, the one or more charge request parameters including a charge request parameter that indicates an amount of charge to be transferred via the battery charge transfer.

7. The system of claim 2, the one or more charge request parameters including a charge request parameter that indicates a duration for the battery charge transfer.

8. The system of claim 1, the memory storing instructions executable by the processor to select the multiple suggested charge-providing vehicles based on confidence scores associated with the multiple suggested charge-providing vehicles.

9. The system of claim 8, the suggested provider data indicating the confidence scores associated with the multiple suggested charge-providing vehicles.

10. The system of claim 1, the memory storing instructions executable by the processor to:
send a confirmation request to the selected charge-providing vehicle;
receive a confirmation from the selected charge-providing vehicle in response to the confirmation request; and
send the transfer initiation message responsive to receipt of the confirmation from the selected charge-providing vehicle.

11. A method, comprising:
receiving, from a charge-requesting vehicle, a charge request;
determining a suggested provider pool for fulfilling the charge request, the suggested provider pool including multiple suggested charge-providing vehicles;
sending suggested provider data to the charge-requesting vehicle, the suggested provider data identifying the multiple suggested charge-providing vehicles;
receiving, from the charge-requesting vehicle, a provider selection identifying one of the multiple suggested charge-providing vehicles as a selected charge-providing vehicle;
identifying transfer parameters for a battery charge transfer from the selected charge-providing vehicle to the charge-requesting vehicle;
sending a transfer initiation message to instruct the selected charge-providing vehicle to initiate the battery charge transfer according to the transfer parameters;
actuating at least one of a vehicle camera, a vehicle light, and a vehicle microphone when the charge-providing vehicle is within a specified distance of the charge-requesting vehicle; and
outputting a performance rating for the charge-providing vehicle after the battery charge transfer is completed.

12. The method of claim 11, the charge request comprising one or more charge request parameters.

13. The method of claim 12, comprising:
determining a candidate provider pool based on the one or more charge request parameters; and
selecting the multiple suggested charge-providing vehicles of the suggested provider pool from among a plurality of vehicles of the candidate provider pool.

14. The method of claim 13, comprising determining the candidate provider pool based on charge requestor data for the charge-requesting vehicle.

15. The method of claim 12, the one or more charge request parameters including a charge request parameter that indicates a location for the battery charge transfer.

16. The method of claim 12, the one or more charge request parameters including a charge request parameter that indicates an amount of charge to be transferred via the battery charge transfer.

17. The method of claim 12, the one or more charge request parameters including a charge request parameter that indicates a duration for the battery charge transfer.

18. The method of claim 11, comprising selecting the multiple suggested charge-providing vehicles based on confidence scores associated with the multiple suggested charge-providing vehicles.

19. The method of claim 18, the suggested provider data indicating the confidence scores associated with the multiple suggested charge-providing vehicles.

20. The method of claim 11, comprising:
sending a confirmation request to the selected charge-providing vehicle;
receiving a confirmation from the selected charge-providing vehicle in response to the confirmation request; and
sending the transfer initiation message responsive to receipt of the confirmation from the selected charge-providing vehicle.

* * * * *